United States Patent
Broughton

(10) Patent No.: US 10,378,570 B2
(45) Date of Patent: Aug. 13, 2019

(54) SECURING PIN FOR SECURING STRUCTURAL MEMBERS

(71) Applicant: Roskear Porter Broughton, San Francisco, CA (US)

(72) Inventor: Roskear Porter Broughton, San Francisco, CA (US)

(73) Assignee: Fyrn, San Francisco, CA (US)

( * ) Notice: Subject to any disclaimer, the term of this patent is extended or adjusted under 35 U.S.C. 154(b) by 857 days.

(21) Appl. No.: 14/990,593

(22) Filed: Jan. 7, 2016

(65) Prior Publication Data
US 2016/0223001 A1    Aug. 4, 2016

Related U.S. Application Data

(60) Provisional application No. 62/100,830, filed on Jan. 7, 2015.

(51) Int. Cl.
*F16B 12/18* (2006.01)
*F16B 12/24* (2006.01)

(52) U.S. Cl.
CPC ................... *F16B 12/24* (2013.01)

(58) Field of Classification Search
CPC .... F16B 7/0466; F16B 12/2063; F16B 12/18; F16B 12/20; F16B 12/2009; F16B 12/24
See application file for complete search history.

(56) References Cited

U.S. PATENT DOCUMENTS

| | | | | |
|---|---|---|---|---|
| 3,132,557 A | * | 5/1964 | Bauer | F16B 19/02 411/479 |
| 3,672,710 A | * | 6/1972 | Kroopp | E04B 1/5831 403/252 |
| 3,730,568 A | * | 5/1973 | Giovannetti | F16B 12/2036 403/245 |
| 3,810,341 A | * | 5/1974 | Holz | F16B 12/24 36/67 D |
| 4,116,573 A | * | 9/1978 | Fuchs | F16B 5/0607 403/264 |
| 4,334,797 A | * | 6/1982 | Wahlin | E04B 1/58 403/252 |
| 4,641,983 A | * | 2/1987 | Strassle | E04B 2/766 403/12 |
| 4,893,959 A | * | 1/1990 | Offenbroich | F16B 5/0088 403/12 |
| 5,209,598 A | * | 5/1993 | Zullig | F16B 7/0466 403/255 |

(Continued)

*Primary Examiner* — Daniel J Wiley
(74) *Attorney, Agent, or Firm* — Aka Chan LLP

(57) ABSTRACT

A securing pin for securing two structural members that can be used in the assembly of modular furniture. In one embodiment, the securing pin includes a main cylindrical body having an elongated countersink portion positioned at a first end of the main cylindrical body of the securing pin. The first end of the securing pin configured to be secured to a first structural member and a second end of the securing pin configured to be secured to a second structural member. In one embodiment, the second end of the securing pin is secured to the second structural member by a press-fit attachment with a securing split-ring. A fastening device inserted within the elongated countersink portion of the securing pin to secure, and firmly abut, the first structural member to the second structural member.

25 Claims, 8 Drawing Sheets

(56) References Cited

U.S. PATENT DOCUMENTS

| | | | | |
|---|---|---|---|---|
| 5,375,923 A | * | 12/1994 | Hall | A47B 88/956 312/330.1 |
| 6,960,045 B2 | * | 11/2005 | Schmalzhofer | F16B 7/187 403/252 |
| 8,528,188 B2 | * | 9/2013 | Vestergaard-Jensen | F16B 12/18 29/525.01 |
| 8,992,114 B2 | * | 3/2015 | Ajanovic | F16B 12/2063 403/362 |

* cited by examiner

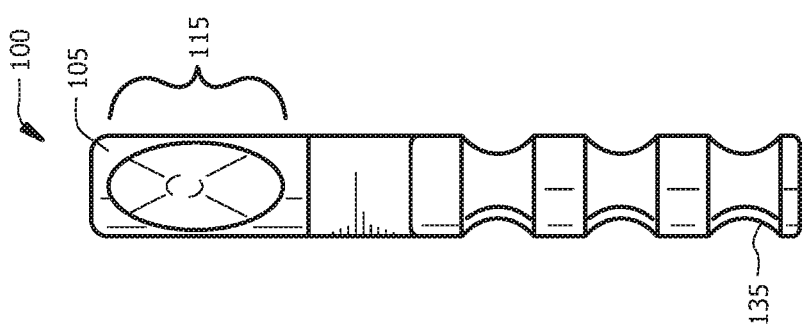
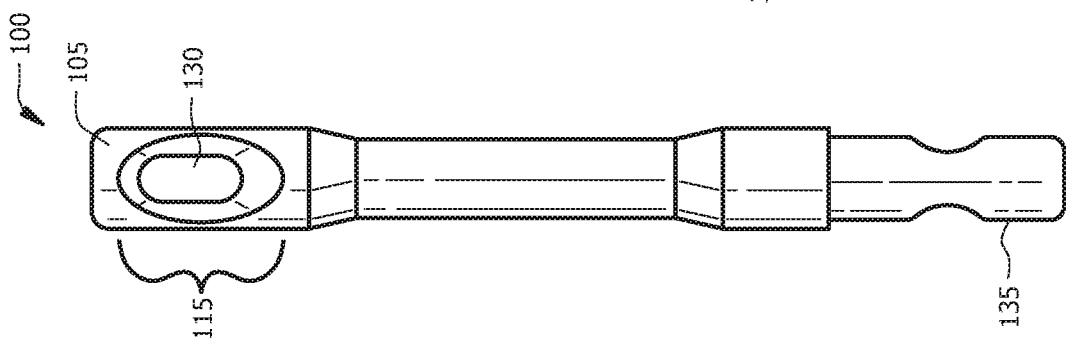
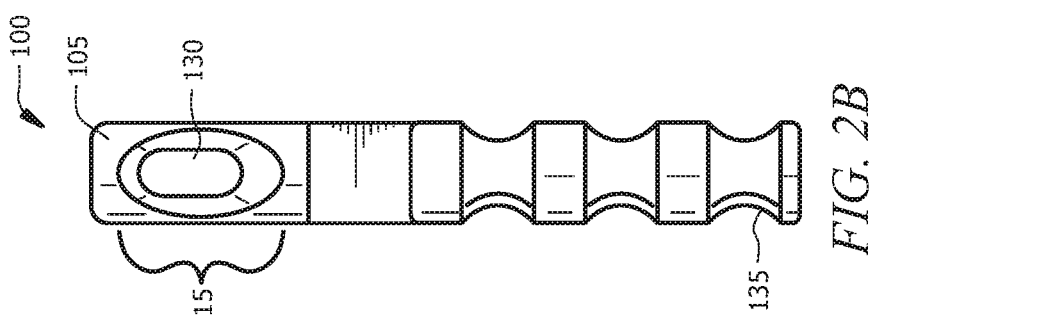
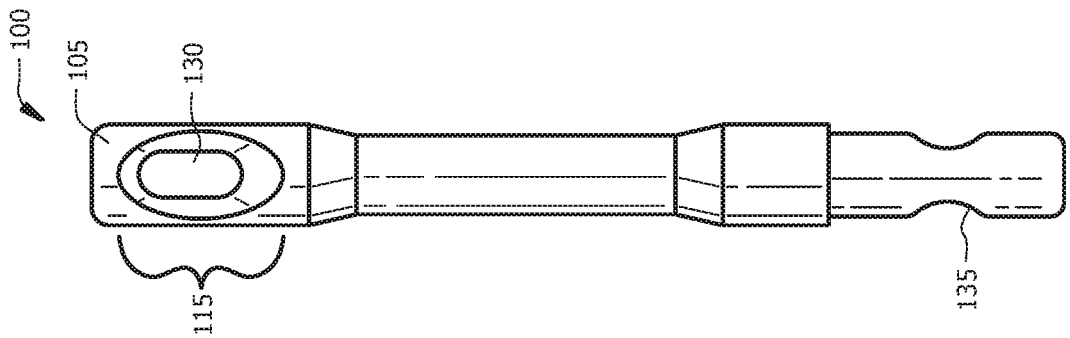

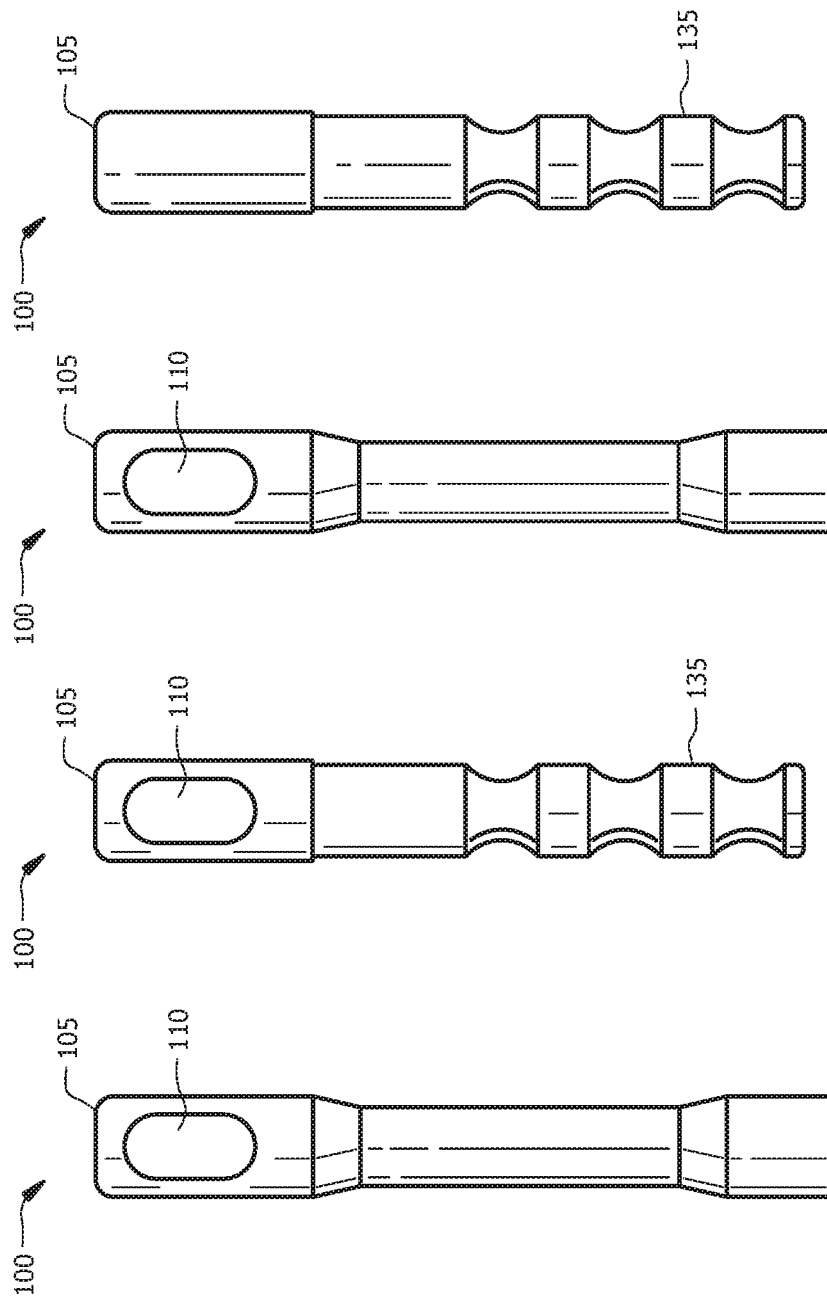

SECURING PIN FOR SECURING STRUCTURAL MEMBERS

TECHNICAL FIELD

The present application relates generally to a securing pin and securing pin assembly for securing one structural member to another structural member and more particularly to a securing pin and securing pin assembly for securing structural members for use in a modular furniture assembly.

BACKGROUND

Modular design of products attempts to combine the manufacturing advantages provided by standardization with the ability to customize the product. In modular design, the components of the product are manufactured separately and fastening devices are used to assemble the components in various configurations, resulting in the desired product. For example, the modular design techniques employed in modular furniture allow the furniture to be sold and shipped in a compact, unassembled form and then assembled by the end-user. The ability to distribute the modular furniture in a more compact form reduces the distribution costs of the modular furniture. Additionally, the modularization of modular furniture allows a variety of component parts to be assembled into numerous design configurations.

While there are obvious benefits to the modular design of products, there also exist several disadvantages. A first disadvantage is the loss of structural strength that results from the use of the fastening devices to connect the modular components together. A second disadvantage is that many modular products are considered to be difficult to assemble and may require the end-user to read extensive directions, which is undesirable. A third disadvantage of modular products, and specifically modular furniture, is that modular furniture is equated with an inferior product. It is evident from the outward appearance of most modular furniture that the furniture is fabricated of components connected by fastening devices, which is commonly considered inferior to custom crafted furniture.

Accordingly, there is a need in the art for an improved modular product that utilizes a fastening device that provides increased strength at the interface point between two modular components. There also exists a need in the art for a modular product that is easy to assemble and limits the visibility of the fastening devices, thereby improving the perceived quality of the modular product.

SUMMARY

A securing pin for securing one structural member to another structural member for use in a modular product is described.

A securing pin for securing two structural members that can be used in the assembly of modular furniture. In one embodiment, the securing pin includes a main cylindrical body having an elongated countersink portion positioned at a first end of the main cylindrical body of the securing pin. The first end of the securing pin configured to be secured to a first structural member and a second end of the securing pin configured to be secured to a second structural member. A fastening device inserted within the elongated countersink portion of the securing pin to secure, and firmly abut, the first structural member to the second structural member.

In one embodiment, the securing pin of the present invention includes an elongated countersink portion and an elongated aperture positioned substantially at the center point of the elongated countersink portion. The elongated countersink portion and the elongated aperture are elongated in a direction along a longitudinal axis of the securing pin.

In another embodiment, the securing pin of the present invention includes an elongated countersink portion without an elongated aperture positioned substantially at the center point of the elongated countersink portion. In this embodiment, the elongated countersink portion is elongated in a direction along a longitudinal axis of the securing pin.

In an additional embodiment, the securing pin may be secured within the second structural member by a securing split-ring positioned with a cylindrical void formed in the second structural member. The securing split-ring includes a cylindrical body having an interior diameter, an exterior diameter and a gap formed between the interior diameter and exterior diameter.

In one embodiment, the securing pin may be secured in the second structural member by inserting the second end of the securing pin into a securing split-ring that is positioned within a void of the second structural member. The dimensions of the second end of the securing pin are such that inserting the second end into the interior diameter of the securing split-ring results in the gap of the split-ring increasing in size to accommodate the diameter of the second end of the securing pin, thereby securing the securing pin in the second structural member by a press-fit attachment with the securing split-ring.

In accordance with the present invention an improved device for securing structural members is provided.

BRIEF DESCRIPTION OF THE DRAWINGS

FIG. 2A, 2B, 2C, 2D are diagrammatic top views of various embodiment of the securing pin of the present invention.

FIG. 3A, 3B, 3C, 3D are diagrammatic bottom views of various embodiment of the securing pin of the present invention.

DETAILED DESCRIPTION

Figure 1D:
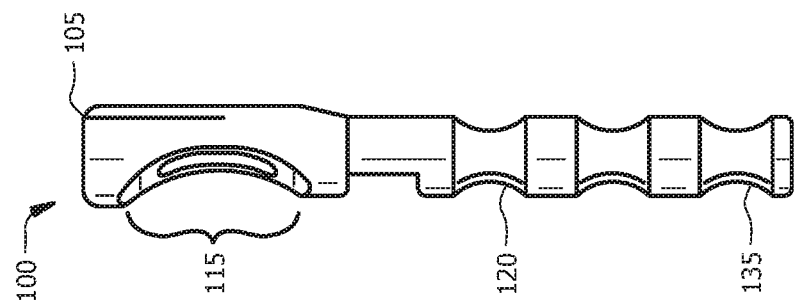
FIG. 1A, 1B, 1C, 1D are diagrammatic side views of various embodiment of the securing pin of the present invention.

Those of ordinary skill in the art will realize that the following detailed description of embodiments in this specification is illustrative only, and is not intended to be in any way limiting. Other embodiments will readily suggest themselves to such skilled persons having the benefit of this disclosure. It will be apparent to one skilled in the art that these specific details may not be required to practice the embodiments. In the following description of the embodiments, substantially the same parts are denoted by the same reference numerals.

In accordance with the present invention, in general, a securing pin is a fastener that is inserted into holes located in two adjacent structural members that secures the two structural members together. In one embodiment, the securing pin, in accordance with the present invention, may include an elongated countersink portion. In general, a countersink is a conical hole cut into a manufactured object. In the present invention the countersink portion may be elongated along a longitudinal axis of the securing pin. In an additional embodiment the countersink portion may be a non-conical hole cut, such as a ramped hole cut.

With reference to FIG. 1, a side view of various embodiments of a securing pin 100 having an elongated countersink portion 115 in accordance with the present invention are illustrated. In general, the securing pin 100 comprises a main cylindrical body 120 having a first end 105 and a second end 135. As shown in FIGS. 1A, 1B, 1C and 1D, the elongated countersink portion 115 of the securing pin 100 is positioned at a first end 105 of the securing pin 100. The first end 105 of the securing pin 100 is configured to be inserted into a hole fabricated in a first structural member. A second end 135 of the securing pin 100 may be constructed in various configurations as necessary to be inserted into a hole fabricated in a second structural member. The second end 135 of the securing pin 100 may be configured to be secured within the second structural member using a fastening device or an appropriate epoxy material (FIG. 1B, FIG. 1D), or alternatively, the second end 135 of the securing pin 100 may be configured to establish a press-fit attachment (FIG. 1A, FIG. 1C) within the second structural member. In one embodiment, the second end 135 of the securing pin 100 is secured within the second structural member by inserting a fastening device through an opening 137 in the second end 135 of the securing pin 100 (FIG. 1A, FIG. 1C)

Figure 1C:
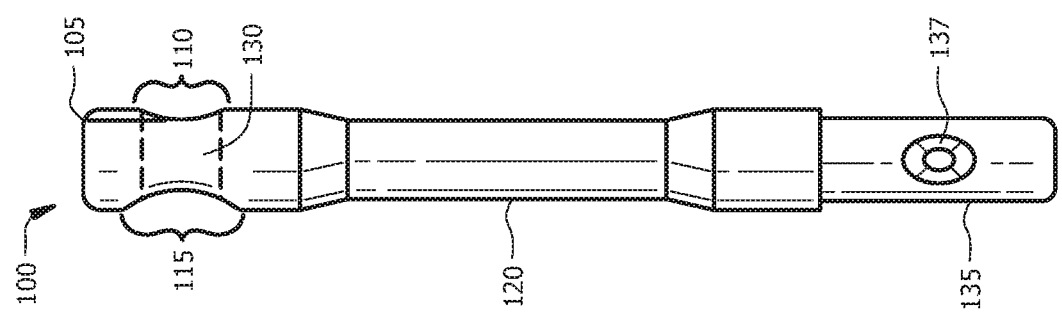
Figure 1B:
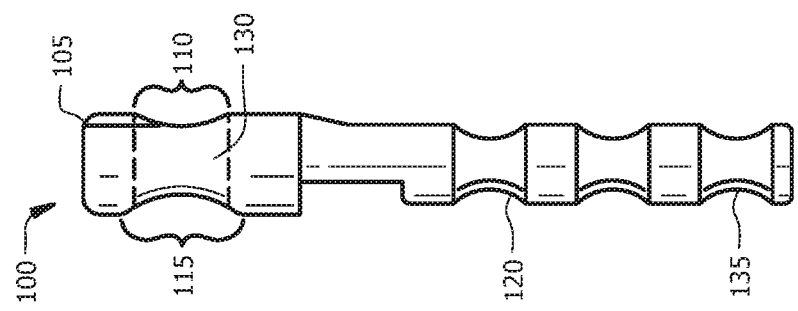
Figure 1A:
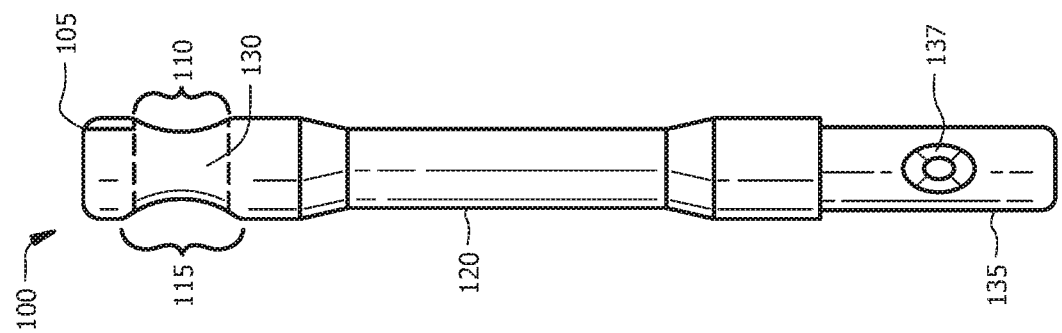

As shown in the embodiment of FIGS. 1A, 1B and 1C, the securing pin 100 includes an elongated opening 110 opposite from, and substantially in line with, the elongated countersink portion 115. Additionally, an elongated aperture 130 is positioned between the elongated countersink portion 115 and the elongated opening 110. In this embodiment, to secure the first structural member to the second structural member, with the first end 105 of the securing pin 100 positioned within a hole of the first structural member and the second end 135 of the securing pin positioned within a hole of the second structural member, a fastener, such as a screw, can be inserted into the elongated countersink portion 115 of the securing pin 100, through the elongated aperture 130 and exiting through the elongated opening 110.

In an additional embodiment, shown in FIG. 1D, the securing pin 100 does not include an elongated opening 110 or an associated elongated aperture 130, and as such, when securing the first structural member to the second structural member, a fastener inserted into the elongated countersink portion 115 of the securing pin 100 will be engaged within the elongated countersink portion 115 of the securing pin 100 when in the secured position.

With reference to FIG. 2, a top view of the various embodiments of the of the securing pin 100 having an elongated countersink portion 110 as illustrated in FIG. 1A-1D are illustrated. As shown in FIGS. 2A, 2B, 2C and 2D, the elongated countersink portion 110 of the securing pin 100 is positioned at a first end 105 of the securing pin 100. The first end 105 of the securing pin 100 is configured to be inserted into a hole fabricated in a first structural member. A second end 135 of the securing pin 100 may be constructed in various configurations as necessary to be inserted into a hole fabricated in a second structural member. The second end 135 of the securing pin 100 may be configured to be secured within the second structural member using a fastening device or an appropriate epoxy material (FIG. 2B, FIG. 2D), or alternatively, the second end 135 of the securing pin 100 may be configured to establish a press-fit attachment (FIG. 2A, FIG. 2C) within the second structural member. As can clearly be seen in this top view, the embodiments of FIGS. 2A, 2B and 2C include an elongated aperture 130 extending between the elongated countersink portion 115 of the securing pin 100 and the elongated opening, opposite the elongated countersink portion 115. Additionally, the embodiment illustrated in FIG. 2D does not include an elongated opening or an elongated aperture.

With reference to FIG. 3, a bottom view of the various embodiments of the of the securing pin 100 having an elongated countersink portion 110 as illustrated in FIG. 1A-1D are illustrated. As shown in FIGS. 3A, 3B, 3C and 3D, the elongated countersink portion 110 of the securing pin 100 is positioned at a first end 105 of the securing pin 100. The first end 105 of the securing pin 100 is configured to be inserted into a hole fabricated in a first structural member. A second end 135 of the securing pin 100 may be constructed in various configurations as necessary to be inserted into a hole fabricated in a second structural member. The second end 135 of the securing pin 100 may be configured to be secured within the second structural member using a fastening device or an appropriate epoxy material (FIG. 3B, FIG. 3D), or alternatively, the second end 135 of the securing pin 100 may be configured to establish a press-fit attachment (FIG. 3A, FIG. 3C) within the second structural member. As can clearly be seen in this bottom view, the embodiments of FIGS. 3A, 3B and 3C include an elongated opening 110 positioned opposite the elongated countersink portion and an elongated aperture 130 extending between the elongated countersink portion of the securing pin 100 and the elongated opening 110. Additionally, the embodiment illustrated in FIG. 3D does not include an elongated opening or an elongated aperture.

In operation of the securing pin 100 of the present invention for securing two structural members, with the first end 105 of the securing pin 110 inserted into a first structural member and the second end 135 of the securing pin 110 inserted into and secured to a second structural member, a fastening device, such as a screw, in inserted through an aperture of the first structural member, that is substantially aligned with the elongated countersink portion 110 of the securing pin 100. Following insertion of the fastening device through the aperture of the first structural member, the fastening device is inserted into the elongated countersink portion 110 of the securing pin 100. After the fastening device has been inserted through the aperture of the first structural member and into the elongated countersink portion 110 of the securing pin 100, the fastening device will be in contact with the elongated countersink portion 110 of the securing pin 100. In one embodiment, subsequent to the contact of the fastening device with the elongated countersink portion 110, the fastening device is tightened, causing the end of the fastening device that is in contact with the elongated countersink portion 110 to travel down the sloped side of the countersink portion 110 until the fastening device is positioned within the elongated aperture 130 of the securing pin 100. In an additional embodiment, wherein the securing pin 100 does not have an elongated aperture 130, the fastening device is tightened until the fastening device is positioned substantially within the center of the elongated countersink portion 110.

In the present invention, tightening the fastening device causes the fastening device to travel down the sloped side of the elongated countersink portion 110, thereby urging the second end 135 of the securing pin 100 in a longitudinal direction toward the first end 105 of the securing pin 100 until the fastening device is either positioned within the elongated aperture 130 or, if the securing pin 100 does not include an elongated aperture 110, until the fastening device is positioned to be in contact with a center point of the elongated countersink portion 110. As such, the elongated countersink portion 110 of the securing pin 100 enables the first structural member to be firmly abutted to the second structural member when a fastening device is inserted into the elongated countersink portion 110. This firm connection between the first structural member and the second structural member afforded by the elongated countersink portion 110 securing pin 100 provides increased strength at the interface point between the first structural member and the second structural member. The perceived quality of a modular product incorporating the structural members and the securing pin 100 is also improved as a result of the visual appearance of the interface point between the structural members.

Figure 4A:
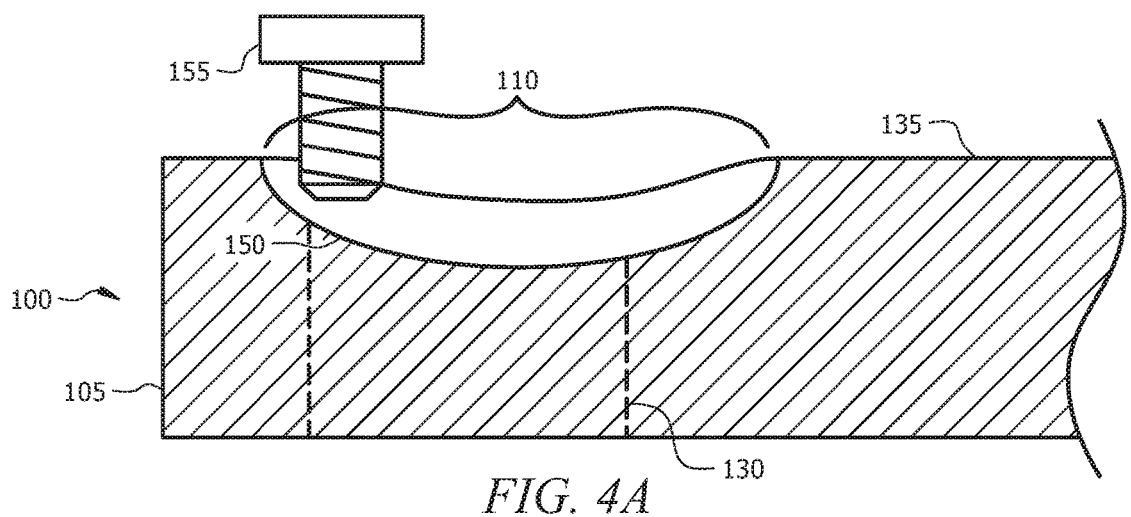
FIG. 4A, 4B are diagrammatic views of an embodiment of the securing pin comprising an elongated aperture in accordance with the present invention.
Figure 4B:
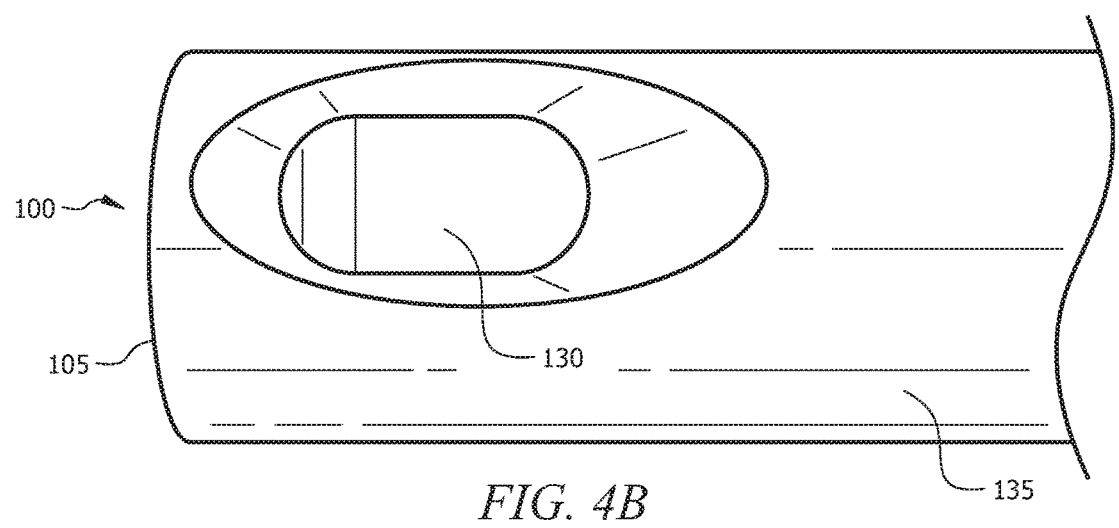

With reference to FIG. 4, a securing pin 100 in accordance with the present invention having an elongated countersink portion 110 and an elongated aperture 130 is illustrated. A cross-sectional view of the securing pin 100 is shown in FIG. 4A and a top-down view of the securing pin 100 is shown in FIG. 4B. Referring to FIG. 4A, assuming that the first end 105 of the securing pin 100 has been inserted into a first structural member and that the second end 135 of the securing pin 100 has been inserted into a second structural member, a fastening device 155 is inserted through the aperture of the first structural member and is subsequently positioned to be in contact with a first side 150 of the elongated countersink portion 110. After the fastening device 155 is inserted into the aperture, the end of the fastening device 155 extending through the aperture engages with a complimentary receiving element positioned within the first structural member. In a particular embodiment, the fastening device 155 is a screw and the complimentary receiving element is a nut having complimentary threading for receiving the screw. In this embodiment, as the fastening device 155 is tightened by engaging the end of the fastening device 155 with the complimentary receiving element, the fastening device 155 travels down the first side 150 of the elongated countersink portion 110, thus pulling the first structural member closer to the second structural member by urging the second end 135 of the securing pin 100 in the direction of the first end 105 of the securing pin 100. As the tightening of the fastening device 155 continues, the fastening device 155 is eventually positioned within the elongated aperture 130 of the securing pin 100, thereby firmly abutting the first structural member against the second structural member.

Figure 5A:
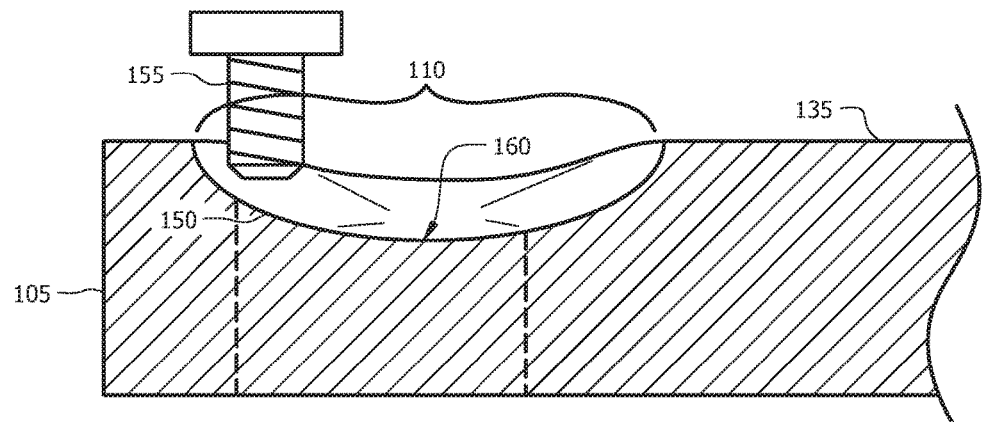
FIG. 5A, 5B are diagrammatic view of an embodiment of the securing pin without an elongated aperture in accordance with the present invention.
Figure 5B:
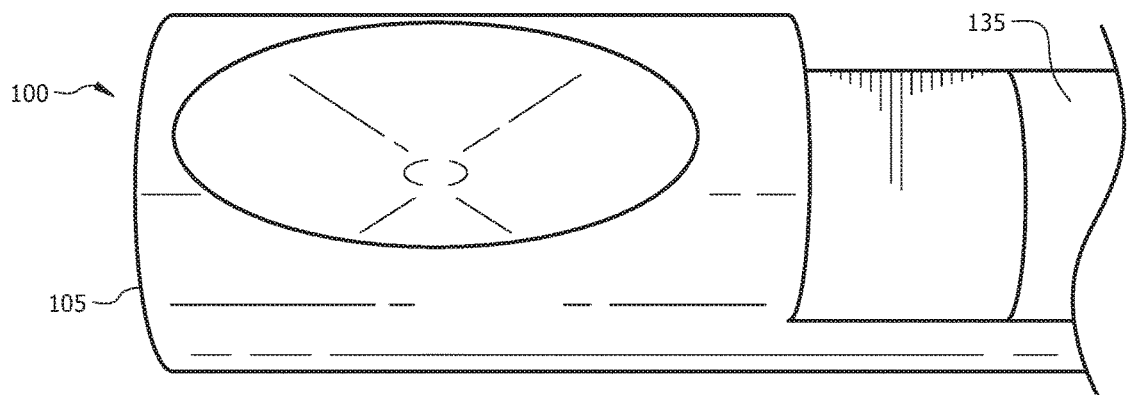

With reference to FIG. 5, a securing pin 100 in accordance with the present invention having an elongated countersink portion 110 without an elongated aperture 130 is illustrated. A cross-sectional view of the securing pin 100 is shown in FIG. 5A and a top-down view of the securing pin 100 is shown in FIG. 5B. Referring to FIG. 5A, assuming that the first end 105 of the securing pin 100 has been inserted into a first structural member and that the second end 135 of the securing pin 100 has been inserted into a second structural member, a fastening device 155 is inserted through the aperture of the first structural member and is subsequently positioned to be in contact with a first side 150 of the elongated countersink portion 110. In this embodiment, as the fastening device 155 is tightened, the fastening device 155 travels down the first side 150 of the elongated countersink portion 110, thus pulling the first structural member closer to the second structural member by urging the second end 135 of the securing pin 100 in the direction of the first end 105 of the securing pin 100. As the tightening of the fastening device 155 continues, the fastening device 155 is pulled closer to the center point 160 of the elongated countersink portion 110 and the fastening device 155 is eventually tightened to the point where the securing pin 100 is secured within the first structural member and the fastening device 155 is firmly abutted against the elongated countersink portion 110 of the securing pin 100. With the fastening device 155 firmly abutted against the elongated countersink portion 110 of the securing pin 100, the first structural member is firmly abutted against the second structural member.

Figure 6:
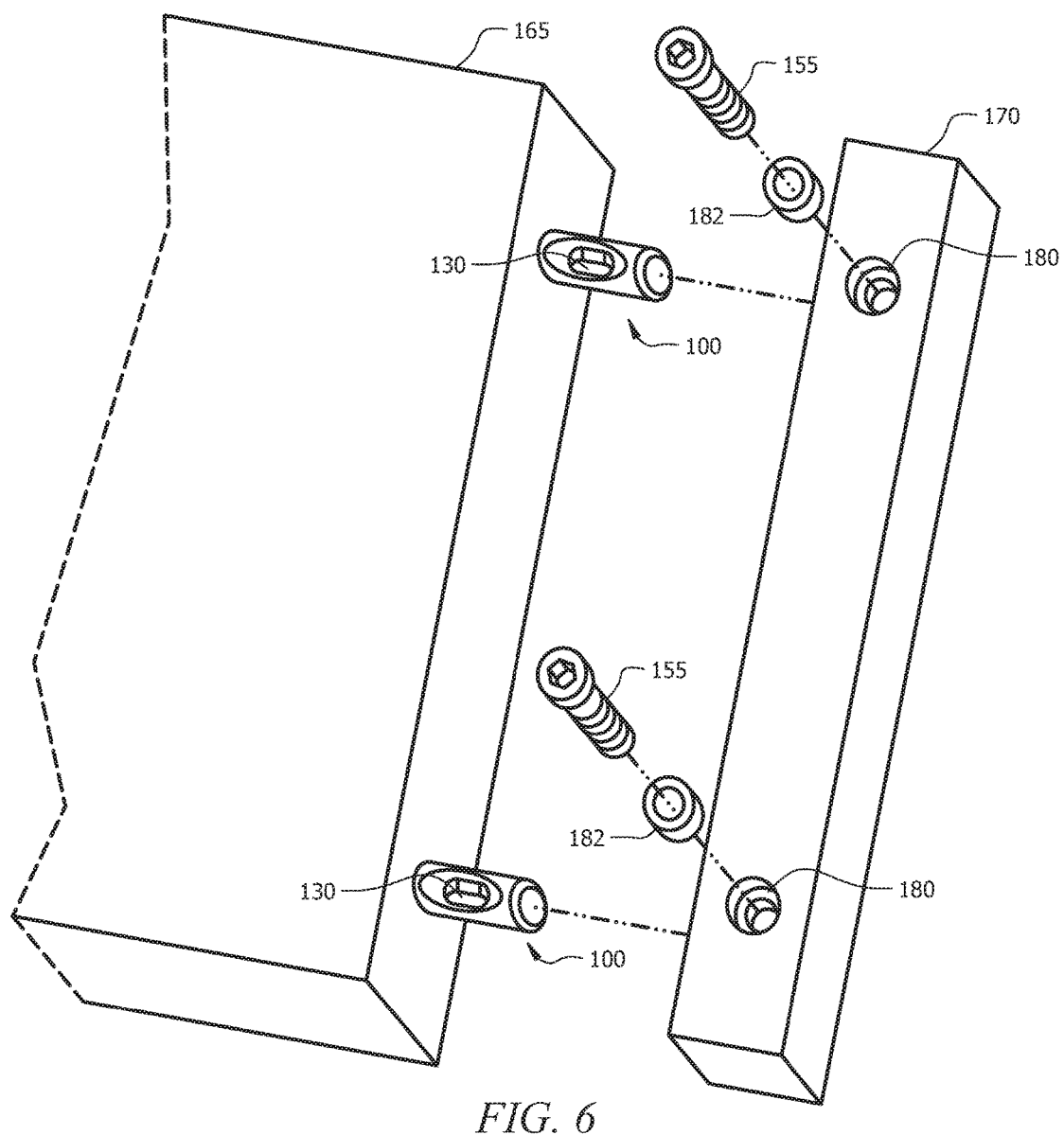
FIG. 6 is a diagrammatic view of a modular product incorporating the securing pin of the present invention.

With reference to FIG. 6, the components of an exemplary modular product utilizing the securing pin 100 in accordance with the present invention are illustrated. As shown in FIG. 6, a second end of securing pins 100 is inserted and secured into a second structural member 165. The first structural member 170 is then aligned with the two securing pins 100 such that the first end of the securing pins 100 is inserted into the first structural member 170 and positioned such that the elongated countersink portion 130 of the securing pins 100 is substantially aligned with the apertures 180 of the first structural member 170. A complimentary receiving element 182 is then positioned within each of the apertures 180 of the first structural member 170. In a particular embodiment, the fastening device 155 is a screw and the complimentary receiving element 182 is a nut having complimentary threading for receiving the screw. A fastening device 155 is then inserted into each of the two apertures 180 of the first structural member 170 to engage with the complimentary receiving elements 182 As the fastening devices 155 are tightened within the complimentary receiving elements 182, the first structural member 170 is urged towards the second structural member 165, as previously described, until the fastening devices 155 are positioned within the elongated countersink portion 130 of the securing pins 100 and first structural member 170 and the second structural member 165 are firmly abutted against each other.

Figure 7A:
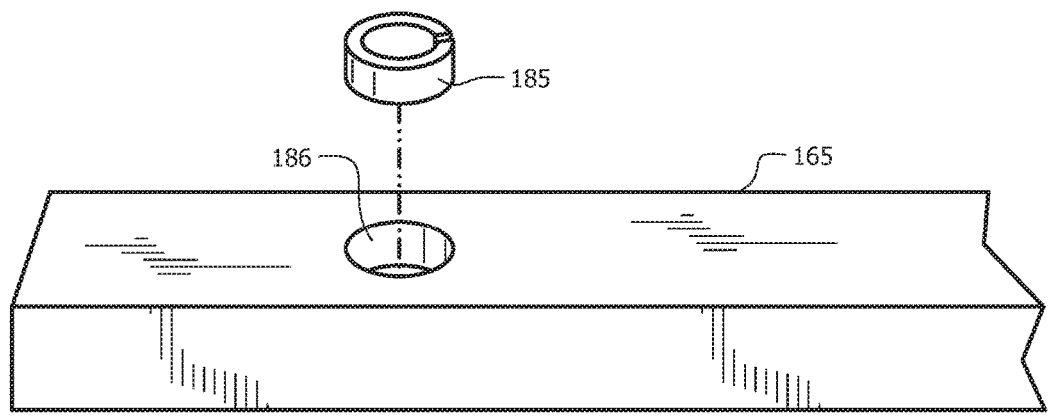
FIG. 7A, 7B, 7C, 7D are a diagrammatic views of the securing split-ring in accordance with an embodiment of the present invention.
Figure 7B:
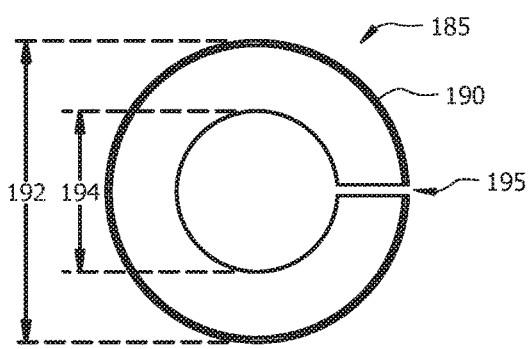
Figure 7C:
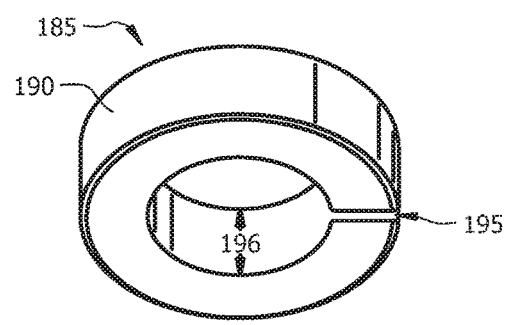
Figure 7D:
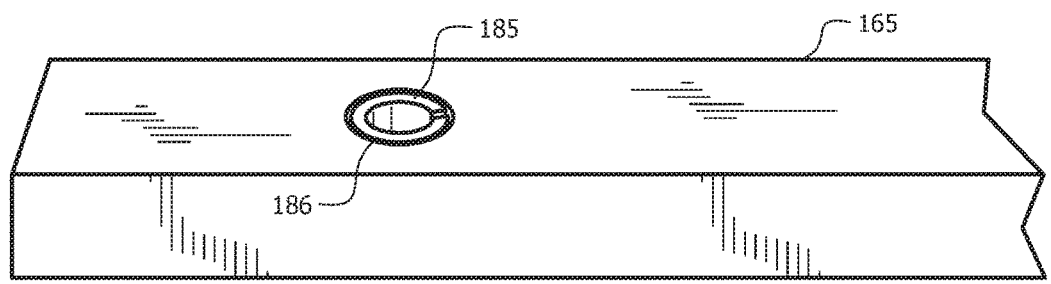

With reference to FIG. 7A, it one embodiment, the second structural member 165 may include a securing split-ring 185 positioned within a substantially cylindrical void 186 formed in the second structural member 165. As shown in more detail in FIG. 7B and FIG. 7C, the securing split-ring 185 may be formed by a substantially cylindrical washer 190 having an interior diameter 194, an exterior diameter 192 and a depth 196. The cylindrical washer 190 further includes a gap 195 formed between the interior diameter 194 and the exterior diameter 192 to form the securing split-ring 185. As shown with reference to FIG. 7D, the securing split-ring 185 is dimensioned to be positioned within a void 186 formed in the second structural member 165.

Figure 8:
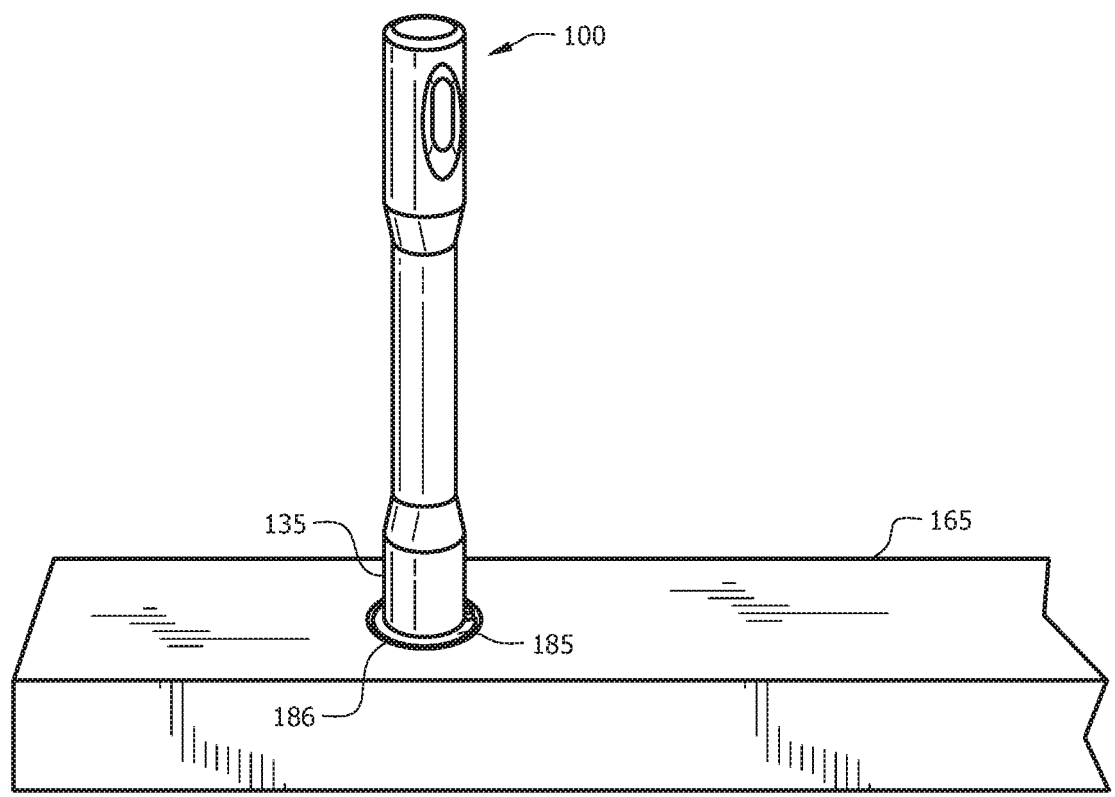
FIG. 8 is a diagrammatic view of the securing split-ring in cooperation with the second securing member in accordance with an embodiment of the present invention.

With reference to FIG. 8, the securing split-ring 185 of the present invention is used to secure the second end 135 of the securing pin 100 to the second structural member 165 using a press fit. In order to provide the press-fit, the second end 135 of the securing pin 100 is dimensioned to be slightly larger than the interior diameter 194 of the securing split-ring 185. In operation, the securing split-ring 185 is positioned within the substantially cylindrical void 186 of the second structural member 165 and the second end 135 of the securing pin 100 is inserted into the interior diameter 194 of the securing split-ring 185. Inserting the second end 135 of the securing pin 100 into the interior diameter 194 of securing split-ring 185 causes the exterior diameter 192 of the securing split-ring to expand within the void 186 thereby resulting in a secured press-fit between the securing pin 100 and the second structural member 165. The gap 195 formed within the cylindrical washer 190 of the securing split-ring 185 allows the exterior diameter 192 of the securing split-ring 185 to expand within the void 186 when the second end 135 of the securing pin 100 is inserted into the interior diameter 194 of the securing split-ring.

The present invention provides an improved modular product that utilizes a fastening device that provides increased strength at the interface point between two modular components. The present invention additionally provides a modular product that is easy to assemble and that has an improved perceived quality.

The foregoing descriptions of specific embodiments of have been presented for purposes of illustration and description. They are not intended to be exhaustive or to limit the invention to the precise forms disclosed, and obviously many modifications and variations are possible in light of the above teaching. The embodiments were chosen and described in order to best explain the principles and practical applications, to thereby enable others skilled in the art to best utilize the various embodiments with various modifications as are suited to the particular use contemplated. It is intended that the scope be defined by the claims appended hereto and their equivalents.

The invention claimed is:

1. A securing pin for securing a first structural member to a second structural member, the securing pin comprising:
   a main body having a first end and a second end;
   the second end of the main body, coupled to the second structural member;
   the first end of the main body comprising a cylindrical shape that is inserted into the first structural member, wherein the first end of the main body comprises an elongated countersink portion and elongated aperture, and the elongated aperture is formed within the elongated countersink portion; and
   a fastening device comprising a cylindrical shank, wherein the fastening device is inserted through a void in the first structural member and the cylindrical shank passes through the elongated aperture of the main body, whereby the fastening device and the main body are effective in securing the first structural member to the second structural member.

2. The securing pin of claim 1, wherein the elongated aperture is elongated along a longitudinal axis of the main body.

3. The securing pin of claim 1, wherein the elongated countersink portion is elongated along a longitudinal axis of the main body.

4. The securing pin of claim 1, wherein the elongated aperture is positioned approximately at a center point of the elongated countersink portion.

5. The securing pin of claim 1, wherein the cylindrical shank of the fastening device is threaded, and at least a portion of the threaded cylindrical shank passes through the elongated aperture.

6. The securing pin of claim 5, further comprising a nut, coupled to the first structural member, wherein the portion of the threaded cylindrical shank that passes through the elongated aperture engages with the nut.

7. The securing pin of claim 1, further comprising a spacer positioned within the void of the first structural member, wherein the cylindrical shank of the fastening device is inserted through the spacer before passing through the elongated aperture of the main body.

8. The securing pin of claim 1, wherein the second structural member comprises at least one securing split-ring positioned within a substantially cylindrical void of the second structural member, whereby the second end of the main body is secured within the second structural member by a press-fit attachment with the securing split-ring of the second structural member.

9. The securing pin of claim 8, wherein the securing split-ring comprises a substantially cylindrical washer having an interior diameter and an exterior diameter, and further comprising a gap formed between the interior diameter and the exterior diameter of the substantially cylindrical washer.

10. The securing pin of claim 9, wherein a diameter of the second end of the main cylindrical body is slightly larger than the interior diameter of the substantially cylindrical washer.

11. The securing pin of claim 9, wherein the securing split-ring is dimensioned to expand within the substantially cylindrical void of the second structural member upon the introduction of the second end of the main body into the interior diameter of the substantially cylindrical washer to provide a press-fit between the securing pin and the second structural member.

12. A method of securing a first structural member to a second structural member, the method comprising:
   securing a second end of a main body of a securing pin within the second structural member;
   inserting a first end of the main body of the securing pin into the first structural member and aligning a void formed in the first structural member with an elongated countersink portion positioned at the first end of the main body of the securing pin; and
   inserting a cylindrical shank of a fastening device through the void formed in the first structural member to engage with the elongated countersink portion at the first end of the main body, wherein the cylindrical shank of the fastening device passes through an elongated aperture of the main body, thereby securing the first structural member to the second structural member.

13. The method of claim 12, wherein the elongated aperture is positioned approximately at a center point of the elongated countersink portion.

14. The method of claim 12, further comprising inserting the cylindrical shank of the fastening device through a spacer placed within the void formed in the first structural member, whereby the cylindrical shank passes through the spacer before passing through the elongated aperture of the main body.

15. The method of claim 12, comprising screwing the fastening device to a nut, coupled to the first structural member, wherein a portion of the cylindrical shank that passes through the elongated aperture engages with the nut.

16. The method of claim 12, further comprising inserting the second end of the main body into a split-ring, positioned in a void of the second structural member, wherein a diameter of the second end is slightly larger than an interior diameter of the split-ring, and the inserting of the second end into the split-ring causes an exterior diameter of the split-ring to expand, thereby engaging the split-ring with the void of the second structural member.

17. A modular furniture assembly comprising:
a first structural member of the modular furniture assembly;
a second structural member of the modular furniture assembly;
a securing pin comprising a main body having a first end and a second end, wherein the second end of the main body is coupled to the second structural member, the first end of the main body is inserted into the first structural member, and the first end of the main body comprises an elongated countersink portion and elongated aperture;
a screw comprising a threaded cylindrical shank, wherein the screw is inserted through a void formed in the first structural member and the threaded cylindrical shank passes through the elongated aperture of the main body; and
a nut, coupled to the first structural member, wherein a portion of the threaded cylindrical shank of the screw that passes through the elongated aperture engages with the nut, thereby securing the first structural member to the second structural member.

18. The assembly of claim 17 comprising:
a split-ring washer, wherein the second end of the main body comprises a larger diameter than an interior diameter of the split-ring washer, the split-ring washer is inserted into a void formed in the second structural member, and the second end is pushed into the split-ring washer such that an exterior diameter of the split-ring washer expands to engage with the void in the second structural member, thereby coupling the main body of the securing pin to the second structural member.

19. The assembly of claim 17 comprising:
a spacer, wherein the spacer is inserted into the void formed in the first structural member, and the threaded cylindrical shank of the screw is inserted through the spacer.

20. The assembly of claim 17, wherein the elongated aperture is elongated along a longitudinal axis of the main body.

21. A modular furniture assembly comprising:
a first structural member of the modular furniture assembly;
a second structural member of the modular furniture assembly;
a securing pin comprising a main body having a first end and a second end, wherein the second end of the main body is coupled to the second structural member, the first end of the main body is inserted into the first structural member, and the first end of the main body comprises an elongated countersink portion and elongated aperture;
a fastening device comprising a cylindrical shank, wherein the fastening device is inserted through a void formed in the first structural member and the cylindrical shank passes through the elongated aperture of the main body; and
a split-ring washer, wherein the second end of the main body comprises a larger diameter than an interior diameter of the split-ring washer, the split-ring washer is inserted into a void formed in the second structural member, and the second end is pushed into the split-ring washer such that an exterior diameter of the split-ring washer expands to engage with the void in the second structural member, thereby coupling the main body of the securing pin to the second structural member.

22. The assembly of claim 21 comprising:
a complimentary receiving element, coupled to the first structural member, wherein a portion of the cylindrical shank of the fastening device engages with the complimentary receiving element.

23. The assembly of claim 22 wherein the fastening device is a screw, and the complimentary receiving element is a nut.

24. The assembly of claim 21 comprising:
a spacer, wherein the spacer is inserted into the void formed in the first structural member, and the cylindrical shank of the fastening device is inserted through the spacer.

25. The assembly of claim 21, wherein the elongated aperture is elongated along a longitudinal axis of the main body.

* * * * *